UNITED STATES PATENT OFFICE.

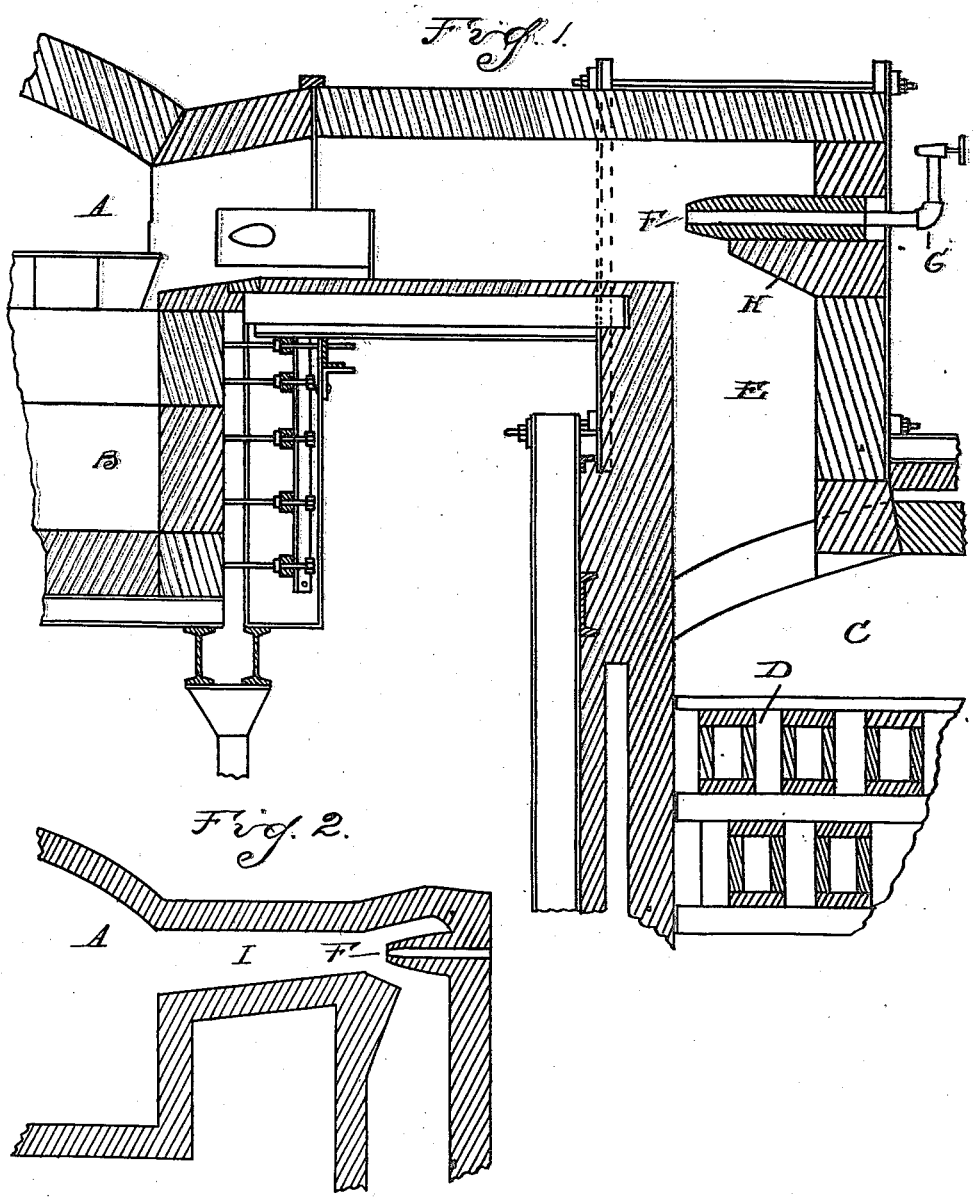

ANTON NELLES, OF NEUENAHR, GERMANY.

INJECTOR-BURNER FOR FURNACES.

1,153,639.  Specification of Letters Patent.  Patented Sept. 14, 1915.

Application filed September 21, 1914. Serial No. 862,644.

*To all whom it may concern:*

Be it known that I, ANTON NELLES, a subject of the Emperor of Germany, residing at Neuenahr, Germany, have invented certain new and useful Improvements in Injector-Burners for Furnaces, of which the following is a specification, reference being had therein to the accompanying drawings.

The invention relates to furnaces and more particularly to constructions designed for use in the glass industry.

It is the object of the invention to facilitate the commingling of the gaseous fuel and the air for supporting combustion, and otherwise to increase the efficiency as hereinafter set forth.

In the drawings, Figure 1 is a vertical section through a furnace to which my injector burner is applied; and Fig. 2 is a diagram showing a slightly modified construction.

The type of furnace to which my improvement is applied is that known as the recuperative furnace, in which the air for supporting combustion is pre-heated by passage through refractory conduits which are surrounded by the gaseous products of combustion from the furnace passing to the stack. The gas which is commingled with the heated air is usually introduced through nozzles or twyers, which are arranged outside of the furnace and directed through apertures therein into the stream of heated air. Such an arrangement has, however, the disadvantage of introducing the gas without any preheating and consequently the high temperature of the air with which the gas commingles is lowered before combustion can take place. With my improved construction the gas before commingling with the air is pre-heated by passing through a refractory nozzle or twyer extending longitudinally of the conduit through which the heated air is passed. Thus the gas is discharged into the air at a temperature substantially that of the air, producing a complete combustion and resulting in a maximum heat generation. A further advantage is that the nozzle being extended in the air conduit operates as an injector to accelerate the velocity of the current and to obtain a more perfect commingling of the gas therewith.

In detail, A is the combustion chamber of a furnace above a glass tank B.

C is the air-preheating chamber containing the refractory cross conduits D, through which the products of combustion from the chamber A are passed. Any suitable arrangement of connections (not shown) may be used for conveying the heated gaseous products from the chamber A to the conduits D, and the arrangement is such that the heat of these combustion products is transferred to the air surrounding the conduits D so as to raise the same to a relatively high temperature.

E is a conduit for conveying the air preheated in the chamber C to the combustion chamber A. Within this conduit is arranged a nozzle or twyer F formed of a refractory material and connected at its outer end with a gas supply conduit G. The nozzle F is so proportioned to the conduit E and to the heat value of the gaseous fuel as to form the most advantageous mixture for combustion. The nozzle is mechanically supported by any suitable means, such as the reinforcement block H arranged therebeneath, and both this block and the nozzle are in the path of the heated air passing through the conduit E.

In operation, when the furnace is under full heat, the products of combustion passing through the conduits D will raise the temperature of the air passing through the chamber C, and the heated air will then pass through the conduit E to the combustion chamber A. The nozzle F which is in the path of this air current will also be raised to a high temperature and the gas which passes through the nozzle will be heated thereby, so that when commingled with the air it will not materially lower the temperature thereof. As the nozzle is arranged centrally within the conduit E it will act as an injector, propelling the air so as to increase its velocity and to direct the combustible mixture into the furnace chamber A toward the remoter portions thereof as well as those near the point of entrance.

In the modified construction shown in Fig. 2, in place of forming the conduit E of a straight tube a double tapered tube I is substituted therefor. This is arranged in such relation to the injector nozzle F as to produce the most favorable action for commingling the air and gas and accelerating the velocity of the current.

What I claim as my invention is:—

In a furnace, the combination with a combustion chamber, of means exterior to the furnace for preheating the air to support combustion, a conduit through which the preheated air is conducted to the combustion chamber having portions extending at right angles, a nozzle for the admission of gaseous fuel, projecting toward the furnace in the conduit at the juncture of said portions, and communicating with a passage through the conduit wall, and a member projecting from said wall, supporting the nozzle and restricting the conduit adjacent said nozzle.

In testimony whereof I affix my signature in presence of two witnesses.

ANTON NELLES.

Witnesses:
　Louis Vandory,
　Hermann Albert Hall.